United States Patent
Chougnet-Sirapian et al.

(10) Patent No.: US 10,632,497 B2
(45) Date of Patent: Apr. 28, 2020

(54) LATEX-BONDED METAL AND CEMENT MEMBERS

(71) Applicant: SCHLUMBERGER TECHNOLOGY CORPORATION, Sugar Land, TX (US)

(72) Inventors: Alice Chougnet-Sirapian, Elancourt (FR); Sylvaine Le Roy-Delage, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/091,727

(22) PCT Filed: Mar. 29, 2017

(86) PCT No.: PCT/EP2017/000378
§ 371 (c)(1),
(2) Date: Oct. 5, 2018

(87) PCT Pub. No.: WO2017/174179
PCT Pub. Date: Oct. 12, 2017

(65) Prior Publication Data
US 2019/0151893 A1     May 23, 2019

(30) Foreign Application Priority Data
Apr. 8, 2016    (EP) .................................. 16305414

(51) Int. Cl.
*E21B 33/14*      (2006.01)
*B05D 7/14*       (2006.01)
(Continued)

(52) U.S. Cl.
CPC ................ *B05D 7/146* (2013.01); *B32B 1/08* (2013.01); *B32B 7/04* (2013.01); *B32B 13/06* (2013.01);
(Continued)

(58) Field of Classification Search
None
See application file for complete search history.

(56) References Cited

U.S. PATENT DOCUMENTS 521,740 A    6/1894 Tillinghast et al.
524,878 A    8/1894 Worthington
(Continued)

FOREIGN PATENT DOCUMENTS

EP    197609 A2    10/1986
GB    1220633      1/1971
(Continued)

OTHER PUBLICATIONS

Extended European Search Report issued in European Patent Appl. No. 16305414.1 dated Oct. 14, 2016; 9 pages.
(Continued)

*Primary Examiner* — Andrew Sue-Ako

(57) ABSTRACT

A dried latex emulsion coating on a surface of a metal member is used as a thin bond layer on well tubular joints, on tubular strings in wells, and on other metal members. The bond layer promotes adhesion to cement members formed from hardening a cement slurry in contact with the bond layer. The bond layer can be used in bonded cement structures, on well tubular joints, on tubular strings in a well, on tubular strings cemented in a well, in methods of making the cement structures and the tubular strings, and in methods of placing and cementing a tubular string in a well.

12 Claims, 3 Drawing Sheets

(51) Int. Cl.
*B32B 13/12* (2006.01)
*C09K 8/42* (2006.01)
*B32B 15/18* (2006.01)
*B32B 7/04* (2019.01)
*B32B 13/06* (2006.01)
*B32B 1/08* (2006.01)
*C04B 28/02* (2006.01)
*E21B 17/08* (2006.01)
*C08F 2/22* (2006.01)
*C08F 212/08* (2006.01)
*C08F 220/18* (2006.01)

(52) U.S. Cl.
CPC .............. *B32B 13/12* (2013.01); *B32B 15/18* (2013.01); *C04B 28/02* (2013.01); *C09K 8/42* (2013.01); *E21B 17/08* (2013.01); *E21B 33/14* (2013.01); *B05D 2202/15* (2013.01); *B05D 2502/005* (2013.01); *B32B 2250/02* (2013.01); *B32B 2255/06* (2013.01); *B32B 2255/24* (2013.01); *B32B 2264/0207* (2013.01); *B32B 2264/0214* (2013.01); *B32B 2264/0221* (2013.01); *B32B 2264/0235* (2013.01); *B32B 2264/0257* (2013.01); *B32B 2264/0264* (2013.01); *B32B 2264/108* (2013.01); *B32B 2307/50* (2013.01); *B32B 2307/732* (2013.01); *B32B 2597/00* (2013.01); *C08F 2/22* (2013.01); *C08F 212/08* (2013.01); *C08F 220/18* (2013.01)

(56) References Cited

U.S. PATENT DOCUMENTS

| | | | |
|---|---|---|---|
| 661,443 A | 11/1900 | Coulon |
| 744,769 A | 11/1903 | Lanzendoerfer |
| 894,825 A | 8/1908 | Gerlach |
| 907,328 A | 12/1908 | Freeman |
| 937,508 A | 10/1909 | Butcher |
| 1,248,645 A | 12/1917 | Gottwals |
| 1,253,105 A | 1/1918 | Stevens |
| 1,258,506 A | 3/1918 | Wallace |
| 1,300,980 A | 4/1919 | Doux |
| 1,322,426 A | 11/1919 | Gearhart |
| 1,431,785 A | 10/1922 | Emery |
| 1,499,719 A | 7/1924 | Bile |
| 1,996,285 A | 4/1935 | Eckhart |
| 2,272,891 A | 2/1942 | Coben |
| 2,484,336 A | 10/1949 | Epstein et al. |
| 3,593,795 A | 7/1971 | Broussard |
| 4,716,965 A | 1/1988 | Bol et al. |
| 6,171,386 B1 | 1/2001 | Sabins |
| 6,868,909 B2 | 3/2005 | Murray |
| 7,650,940 B2 | 1/2010 | Reddy et al. |
| 2002/0195249 A1 | 12/2002 | Murray |
| 2007/0151730 A1 | 7/2007 | Reddy et al. |
| 2010/0282672 A1 | 11/2010 | Schillaci |
| 2013/0220612 A1 | 8/2013 | Karcher et al. |
| 2014/0216742 A1* | 8/2014 | Darbe ............... E21B 33/14 166/285 |

FOREIGN PATENT DOCUMENTS

| | | |
|---|---|---|
| WO | 2003002844 A1 | 1/2003 |
| WO | 2007074330 A1 | 7/2007 |
| WO | 2009091343 A2 | 7/2009 |
| WO | 2010037561 A1 | 4/2010 |
| WO | 2011159355 A2 | 12/2011 |
| WO | 2011159355 A9 | 3/2012 |

OTHER PUBLICATIONS

International Search Report and Written Opinion issued in International Patent Appl. No. PCT/EP2017/000387 dated Jul. 10, 2017; 14 pages.

* cited by examiner

LATEX-BONDED METAL AND CEMENT MEMBERS

The present application claims priority to PCT Application Publication No. WO/2017/174179 or PCT/EP2017/000378 filed on Mar. 29, 2017, which claims priority to European Procedure (EP) Application Serial No. 16305414.1, filed on Apr. 8, 2016, both of which are incorporated herein by reference in their entirety.

BACKGROUND

The present application claims priority to European Procedure (EP) Application Serial No. 16305414.1, filed on Apr. 8, 2016, which is incorporated herein by reference in its entirety.

The statements in this section merely provide background information related to the present disclosure and may not constitute prior art.

The present disclosure broadly relates to metal bonding, cement and cementing operations.

Hydraulic cement is any substance provided (at least at one time in the manufacturing process) in a powdered or granular form, that when mixed with a suitable amount of water, can form a paste that can be poured or molded to set as a solid mass. In the oil and gas industry, good bonding between set cement and casing is essential for effective zonal isolation. Poor bonding limits production and reduces the effectiveness of stimulation treatments. Communication between zones can be caused by inadequate mud removal, poor cement bonding, expansion and contraction of the casing resulting from internal pressure variations or thermal stresses, and cement contamination by drilling or formation fluids. Under such circumstances a small gap or microannulus may form at the cement/casing interface.

Attempts have been made to improve the bonding between the well casing the cement. For example, U.S. Pat. No. 7,650,940 is generally directed to the inclusion of carboxyl groups in particulate elastomers in a cement composition to enhance adhesion between the cement composition and the casing and/or the wall of the subterranean formation. U.S. Pat. No. 4,716,965 is generally directed to providing a layer of elastomeric foam on the outside of the casing, which is alleged to remain resilient and retain structural integrity of the cement sheath after being compressed between the casing and the cement. However, the foam is expensive, easily damaged, and adds a significant amount of thickness to the casing.

The industry in general is in need of ways to improve the bond between cement and metal members in general, to improve the bond between the cement and the casing or other tubular member within the well annulus, as well as ways to prevent a microannulus from forming between the casing or other tubular member and the cement sheath.

SUMMARY

Some embodiments of the present disclosure are directed to a bond layer on the surface of a metal member comprising a thin, e.g., less than 1 mm thick, dried latex emulsion coating, and or directed to the bond layer used to join the metal member surface to a hardened cement member, e.g., on tubulars and in methods to promote adhesion between the tubular and the cement.

In embodiments, a bonded cement structure comprises a bond layer joining opposing surfaces of a metal member and a hardened cement member, the bond layer comprising a dried latex emulsion coating applied as a latex emulsion to the metal member surface and dried in place to a thickness greater than 0.01 millimeters and less than 1 millimeter, the cement member comprising cement hardened from a cement slurry applied to the dried latex coating and set in place.

In embodiments, a well tubular joint comprises a tubular metal member comprising on an outer surface thereof a bond layer comprising a dried latex emulsion coating having a thickness greater than 0.01 millimeters and less than 1 millimeter.

In embodiments a well comprises a wellbore and a tubular string disposed in the wellbore, the tubular string comprising a tubular metal member comprising a bond layer disposed on an outer surface of the metal member, and the bond layer comprising a dried latex emulsion coating. In some embodiments, the well further comprises a hardened cement member comprising an annular sheath having an inner surface bonded to an opposing outer surface of the metal member via the bond layer.

In embodiments a method comprises coating a surface of a metal member with a latex emulsion; drying the latex emulsion coating to form a bond layer on the surface having thickness greater than 0.01 millimeters and less than 1 millimeter; placing a cement slurry in contact with the bond layer; and hardening the slurry to form a cement member having an opposing surface bonded to the surface of the metal member.

In embodiments, a method comprises coating an outer surface of a tubular metal member with a latex emulsion; drying the latex emulsion coating to form a bond layer on the surface having thickness greater than 0.01 millimeters and less than 1 millimeter; and placing the tubular member in a tubular string in a wellbore. In some embodiments, the method further comprises placing a cement slurry in an annulus around the tubular metal member in contact with the bond layer; and hardening the slurry to form an annular cement member having an opposing surface bonded to the outer surface of the metal member.

DETAILED DESCRIPTION

Figure 1A:
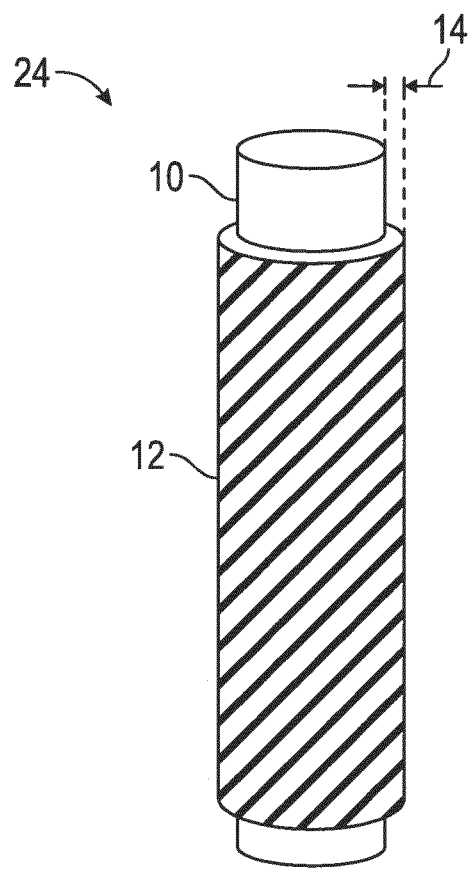
FIG. 1A is a schematic diagram showing a coated well casing according to embodiments of the disclosure.

The present disclosure will be described in terms of treatment of vertical wells, but is equally applicable to wells of any orientation. As used herein, "transverse" is intended to refer to a direction transverse to the axis of the well, e.g., the horizontal direction in a vertical well and vice versa. The disclosure will be described for hydrocarbon-production wells, but it is to be understood that the disclosed methods can be used for wells for the production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated.

Furthermore, each numerical value should be read once as modified by the term "about", unless already expressly so modified, and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that applicant appreciates and understands that any and all data points within the range are to be considered to have been specified, and that the applicant has possession of the entire range and all points within the range.

As used in the specification and claims, "near" is inclusive of "at." The term "and/or" refers to both the inclusive "and" case and the exclusive "or" case, whereas the term "and or" refers to the inclusive "and" case only and such terms are used herein for brevity. For example, a component comprising "A and/or B" may comprise A alone, B alone, or both A and B; and a component comprising "A and or B" may comprise A alone, or both A and B.

In this disclosure, the tubular body or member, which may also be called "a tubular", may be any string of tubulars that may be run into the wellbore and at least partially cemented in place. Examples include casing, liner, solid expandable tubular, production tubing, drill pipe, and the like. For purposes of simplicity and clarity, the following discussion refers to the casing as an example of a tubular.

As used herein, a "set cement" refers to a cement which has set, e.g., been allowed to cure, allowed to harden, and the like, for a time greater than or equal to the "initial set time" as determined according to ASTM C191-04a, "Time of Setting of a Hydraulic Cement by Vicat Needle", or an equivalent thereof. All laboratory testing for purposes herein is determined at 23° C.+/−2° C. and 50%+/−5% relative humidity, unless otherwise stated.

As used herein, a "bond" between the well casing and the set cement refers to acoustically and/or adhesively coupled contact between the well casing and the cement. Accordingly, in embodiments in which the hardened cement member has a surface bonded to the metal member via the bond layer, the hardened cement member is acoustically and/or adhesively coupled to the well casing, or other metal member, through the bond layer.

Likewise, a bond between the set cement and the borehole or formation wall refers to contact between the two such that the two are acoustically coupled and/or form a fluid-tight seal. For purposes herein, a well casing, e.g., a tubular body, also referred to herein as a tubular member, is acoustically coupled to the set cement when the cement is shown to exist behind the well casing by acoustic logging techniques known in the art. For purposes herein, a metal member is adhesively coupled to the set cement when a maximum pull-off force as described herein is greater than 1 kPa.

For purposes herein, a latex, also referred to as a latex emulsion or a latex composition generally refers to a heterogeneous mixture in which a polymer is dispersed in a liquid medium, typically water, which when applied to a surface, forms a generally uniform coating over that surface when the water or other liquid evaporates. Latex emulsions comprise a dispersion of extremely small particles of an immiscible, insoluble liquid and/or a solid material dispersed in the water or other liquid medium. Accordingly, the term latex emulsion actually refers to a polymer colloid; it is to be understood that the dried latex emulsion coatings according to embodiments disclosed herein, which are produced by application and drying of a latex emulsion, may not and do not require inclusion of any actual latex rubber (e.g., produced from the sap of the *parthenium argentatum* tree or the like). The dried latex emulsion coating results from solidification and/or coalescence of the polymer particles present in the latex mixture as the water or other liquid medium evaporates, thereby forming a film or coating on the surface to which the latex emulsion was applied.

As used herein, a latex emulsion coating is "dry" when enough of the liquid medium evaporates from the coating to produce a coating feeling dry to the touch, even though the coating is not 100% dry, e.g., when the coating demonstrates properties consistent with the coating having exceeded the "tack free" time as determined according to ASTM D1640 at 23° C.+/−2° C. and 50%+/−5% relative humidity. A latex coating is "cured" when the coating has reached a maximum hardness by losing essentially 100% of the liquid medium, e.g., when the coating demonstrates properties consistent with the coating having exceeded the "dry-through" time, which is also referred to in the art as "dry-to-handle" time, as determined according to ASTM D1640 at 23° C.+/−2° C. and 50%+/−5% relative humidity.

As used herein for ease of reference, when a polymer or coating is referred to as comprising a monomer, it is understood the monomer is present in the polymer in the as-polymerized form. As used herein, the term oligomer refers to a composition having 2 to 19 "mer" units. As used herein, unless specifically stated otherwise, the term polymer may include an oligomer or a composition having 20 or more "mer" units. A "mer" is defined as a repeating unit of an oligomer or polymer that originally corresponded to the monomer from which the polymer is produced. For example, the "mer" of polystyrene would be the as-polymerized styrene.

As used herein, a "polymer" may include both homopolymers (i.e., a polymer comprising essentially one monomer, and/or a copolymer, which is defined for purposes herein as a polymer comprising more than one monomer.

For purposes herein, an aliphatic moiety is defined as a linear and/or a branched saturated hydrocarbon chain. An alicyclic moiety is defined as a cyclic hydrocarbon chain, which may further include one or more heteroatoms. An olefinic moiety is defined as a linear, branched, and/or cyclic hydrocarbon chain comprising at least one carbon-carbon double bond. As used herein a conjugated diene is defined as an organic compound having two carbon-carbon double bonds separated by a single carbon-carbon single bond, e. g., 1,3-butadiene is a typical example of a conjugated diene. An aromatic moiety refers to a moiety comprising one or more aromatic systems, including one or more heteroaromatic systems.

In embodiments, a metal member comprises a surface coated with a dried latex emulsion coating having a thickness of less than 1 millimeter, i.e., disposed on at least a portion of the surface, e.g., an outer surface of a tubular member.

In embodiments, the latex coating comprises natural latex, synthetic latex, or a combination thereof. In embodiments, the latex coating results from emulsion polymerization of a $C_{4-20}$ conjugated diene with a $C_{2-20}$ olefin. In embodiments, the latex coating comprises the emulsion polymerization product of (the polymerized form of) 1,3-butadiene, 2-methyl-1,3-butadiene, 2-chloro-1,3-butadiene, piperylene-2,3-dimethyl-1,3-butadiene styrene, methylstyrene, p-chlorostyrene, acrylic acid, methyl acrylate, methyl methacrylate, butyl acrylate, acrylonitrile, 2-phenoxy ethyl methacrylate, methyl 2-hydroxy ethyl acrylate, acrylonitrile, methyl vinyl ether, methyl vinyl ketone, neoprene, isoprene, and so on, or any combination thereof.

In embodiments, the thickness of the latex coating, i.e., the average thickness, is from 0.01 mm to 1 mm, or from 0.01 mm to 0.5 mm. In embodiments, the latex coating has been dried to exhibit properties of being tack free, as determined according to ASTM D1640 at 23° C.+/−2° C. and 50%+/−5% relative humidity.

In embodiments, the latex is selected to provide an adhesion strength of the bond between the cement member and the metal member increased by at least 50% relative to the adhesion strength of the bond without the bond layer, wherein the strength of the bond between the cement member and the metal member is determined by a pull-off test at a displacement rate of 0.05 mm/minute, adjusting the maximum pull-off force for the weight of the cement sample mold (including associated hardware such as screws and a top plate), and dividing the net maximum pull-off force by the surface area of the bond. In some embodiments, the latex provides adhesion such that the adhesion strength of a set cement sample bonded to a 100 micron thick layer of the latex coating disposed on a sand blasted stainless steel coupon is greater than 1.5 times a comparative net maximum pull-off force of an identical set cement sample bonded directly to an identical sand blasted stainless steel coupon without the latex coating, wherein the net maximum pull-off force is determined at 0.05 mm/minute under identical conditions in the same way.

In embodiments, the net maximum pull-off force divided by the surface area of the set cement sample, which is bonded to the 100-micron thick bond layer of the latex coating is greater than 0.15 MPa.

In embodiments, a method comprises coating (at least a portion of) a surface of a metal member such as a tubular with a latex emulsion and drying the emulsion to form a bond layer of the latex having a thickness less than 1 millimeter. In embodiments, the coated tubular member is placed in a wellbore, e.g., in a casing or other string.

In embodiments, the method further comprises cleaning the outer surface of the metal member prior to coating with the latex emulsion, e.g., by sandblasting.

In embodiments, the method further comprises drying the latex emulsion coating such that the dried coating exhibits properties of being tack free as determined according to ASTM D1640 at 23° C.+/−2° C. and 50%+/−5% relative humidity, prior to placement into the wellbore and/or prior to placing the cement slurry in contact with the (coated) metal member. In embodiments, the conditions sufficient to allow the latex coating to dry include heating and/or irradiation, e.g., exposing the coated casing to increased temperature, UV radiation, infrared radiation, forced air flow, aging at ambient conditions for a period of time in excess of the tack free time determined according to ASTM D1640 at 23° C.+/−2° C. and 50%+/−5% relative humidity, or a combination thereof.

In embodiments the method further comprises preparing a cement slurry comprising water and hydraulic cement; placing the slurry in an annular region of the wellbore between the coated tubular and the wellbore; and allowing the cement to harden to form a hardened annular cement sheath acoustically coupled to the coated tubular.

In embodiments, the dried latex emulsion coating is derived from a latex emulsion composition comprising natural latex, synthetic latex, or a combination thereof. In embodiments, the dried latex emulsion coating and composition consist essentially of synthetic latex. In embodiments, the latex emulsion composition is an aqueous or water-based latex. In embodiments, the dried latex emulsion coating composition results from emulsion polymerization of a substituted or unsubstituted 1,3 butadiene with an olefin having from 2 to 20 carbon atoms. Examples include ethylene, propylene, vinyl, styrene, and the like. In embodiments, the latex coating composition comprises polymer resin derived from acrylonitrile, acrylate, styrene, and acrylic acid monomers, which is known in the art as a styrene-acrylic latex. In embodiments, the styrene-acrylic latex composition is selected to form a coating having enhanced adhesion to steel surfaces relative to other latex coating compositions.

In embodiments, the thickness of the latex coating on the outer surface of the well casing is less than 1 mm. Thicknesses of less than 1 mm facilitate homogeneous drying, minimally impact accurate cement bond acoustic log characterization, and substantially increase the pull-off force required to break the bond between the casing and the cured cement attached thereto via the latex coating; whereas thicker coatings generally have the opposite results.

In embodiments, the thickness of the dried latex emulsion coating bond layer is greater than about 10 micrometers, or greater than about 20 micrometers, or greater than about 30 micrometers, or greater than about 40 micrometers, or greater than about 50 micrometers, and less than about 1 mm, or less than about 900 micrometers, or less than about 800 micrometers, or less than about 700 micrometers, or less than about 600 micrometers, or less than about 500 micrometers, or less than about 400 micrometers, or less than about 300 micrometers, or less than about 200 micrometers or less than about 150 micrometers. In embodiments, the thickness of the latex coating disposed on the outer surface of the casing tubular is greater than or equal to about 10 micrometers and less than or equal to about 100 micrometers.

In embodiments improved adhesion of the dried latex emulsion coating to the outer surface of the well casing or other tubular may be obtained by cleaning the outer surface prior to application of the latex coating. In embodiments, the outer surface of the casing tubular may be chemically treated, for example via acid washing, degreasing, and the like. In embodiments, the outer surface of the casing tubular may be sandblasted or subject to other types of contact with abrasives to remove contaminants thereon and/or roughen the surface.

In embodiments, the drying of the latex emulsion coating results in improved adhesion of the cement to the casing as demonstrated by increased pull-off force. In embodiments, the latex coating may be dried by applying heat to the coating at a temperature and for a period of time sufficient to remove (evaporate) a majority of the liquid medium from latex coating such that the coating exhibits properties of being tack free, which may include employing a mechanical tack tester according to ASTM D1640. In embodiments, the latex coating may be exposed to UV radiation, infrared radiation, heated or ambient forced air flow, or the like. In embodiments, the latex coating may simply be allowed to age at ambient conditions (i.e., air dry) for a period of time in excess of the tack free time determined according to ASTM D1640 at 23° C.+/−2° C. and 50%+/−5% relative humidity, or a combination thereof.

In embodiments, the latex coating is fully cured such that the coating is dried-through. ASTM D1640 characterizes a dried through coating as one in which a test panel coated with the latex is placed in a horizontal position at a height such that when the thumb is placed on the coating, the arm of the operator is in a vertical line from the wrist to the shoulder. The operator then bears down on the coating with the thumb, exerting the maximum pressure of the arm, at the same time turning the thumb through an angle of 90° in the plane of the coating. The coating is considered to be dry-through or dry-to-handle when there is no loosening, detachment, wrinkling, or other evidence of distortion of the coating.

In embodiments, once the coated well casing is disposed within the wellbore, the wellbore is cemented i.e., a cement slurry comprising water and hydraulic cement is prepared and placed in the annular region of the wellbore between the coated casing section and a wall of the wellbore. The cement is then allowed to set (harden) to form a hardened annular cement sheath bonded to the well casing. The bond between the well casing and the cement is demonstrated by the cement being acoustically coupled to the coated casing section.

Figure 2:
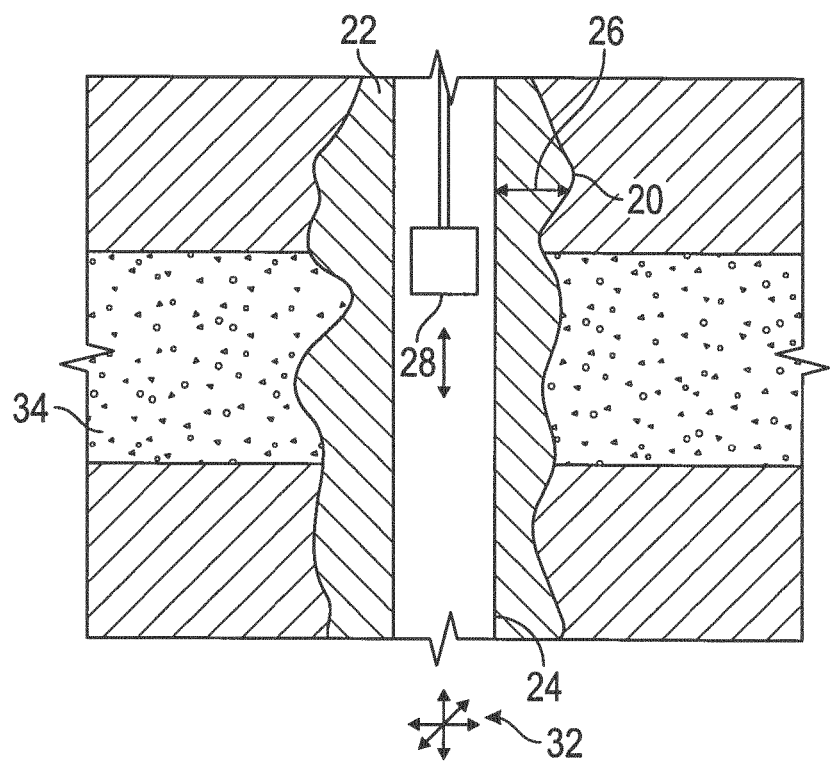
FIG. 2 shows a diagram of a well cemented according to embodiments of the disclosure.
Figure 3:
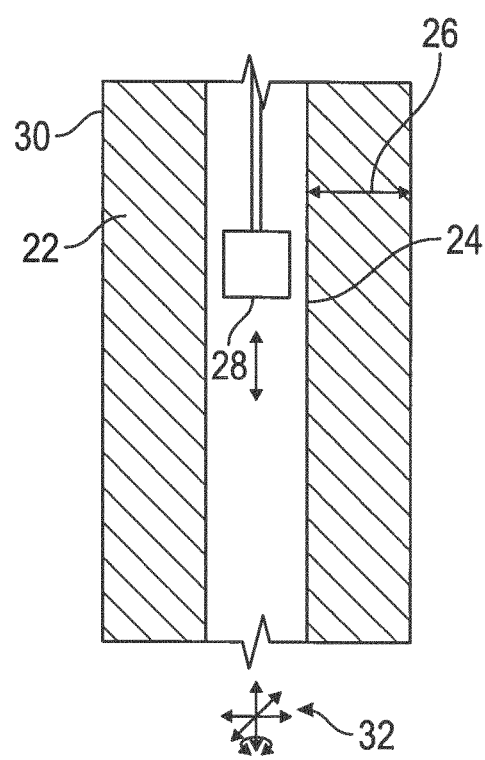
FIG. 3 shows a diagram of an annulus between two tubular members cemented according to embodiments of the disclosure.

Accordingly, in embodiments, the cement slurry is then placed in an annular region between the coated well casing and a borehole wall or a second tubular body (see FIGS. 2 and 3). The slurry is then allowed to at least partially set e.g., allowed to harden, to form a set cement bonded to the well casing and the borehole wall or between the well casing the second tubular body.

In some embodiments, the bond between the coated well casing and the cement slurry is sufficient such that bond between the well casing and the cement is maintained after fluctuating the dimensions of the well casing e.g., allowing the dimensions of the well casing to fluctuate in response to a temperature change, a pressure change, or a mechanical disturbance resulting from a well intervention or a combination thereof.

In embodiments, the bond between the well casing and the set cement and optionally with the borehole wall and the set cement is sufficient to isolate a zone of the formation adjacent the set cement. In embodiments, the strength of the bond between the cement and the well casing is sufficient so that the bond is maintained adjacent the isolated zone after dimensions of the well casing are fluctuated, e.g., allowed to fluctuate in response to a temperature change, a pressure change, or a mechanical disturbance resulting from a well intervention or a combination thereof.

In embodiments, the method may further include determining the presence of cement behind the well casing in a subterranean well. The coated well casing is placed in the wellbore, followed by placement of a cement slurry in an annular region between a well casing and a borehole wall or a second tubular body. The slurry is hardened, e.g., allowed to harden, to form a set cement. An acoustic logging tool is then introduced into the well casing. The tool measures acoustic impedance, amplitude, attenuation or a bond index or a combination thereof. In some embodiments, the measurements are taken azimuthally, longitudinally or both along the tubular body.

In embodiments, the viscosity of the cement slurry during placement (prior to the initial set time determined according to ASTM C191-04a) may be lower than 1000 cP at a shear rate of 100 s$^{-1}$. The hydraulic cement may comprise Portland cement, calcium aluminate cement, fly ash, blast furnace slag, lime, silica, a lime/silica blend, zeolites, magnesium oxychloride, a geopolymer, or a chemically bonded phosphate ceramic, or combinations thereof. In some embodiments the hydraulic cement consists of or consists essentially of Portland cement. In embodiments, the cement slurry may further comprise silica, diatomaceous earth, gilsonite, hematite, ilmenite, manganese tetraoxide, barite, glass or ceramic microspheres or combinations thereof. For all aspects, the composition may further comprise extenders, lost-circulation materials, fibers, dispersants, fluid-loss additives, antifoam agents, gas migration control agents, surfactants, expanding agents, gas generating agents, and the like.

In some embodiments herein, the cement slurry may be free of added organic polymers including latex, other than the latex forming the bond layer between the metal member and the cement. In other embodiments, the composition may further contain polymer particles, which may comprise, for example, one or more members selected from the group consisting of natural rubber, polyamides, polypropylene, acrylonitrile butadiene rubbers, polyethylene, styrene butadiene, uintaite (also known by the commercial name GILSONITE), styrene isoprene styrene (SIS) rubber, styrene isoprene copolymers, styrene butadiene styrene (SBS) rubber, styrene divinylbenzene, fluoroelastomers, perfluoroelastomers, polyphenylene sulfide, polyether-etherketones, petroleum coke derivatives, coal, and the like. The polymer particles may have an average particle size between 1 and 2000 micrometers, or between 50 and 1000 micrometers, or between 150 and 750 micrometers. The polymer particles may be present in granular or fibrous form, or both.

Figure 1B:
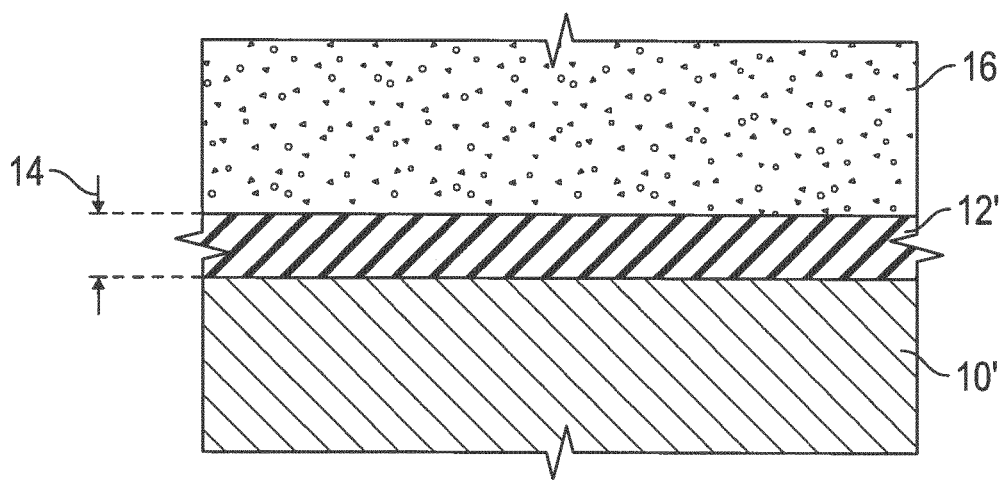
FIG. 1B is a schematic cross-sectional diagram of the coated well casing of FIG. 1B with an overlying layer of cement according to embodiments of the disclosure.

As shown in FIGS. 1A and 1B, in embodiments, a metal member in the form of coated well casing 24 comprises a tubular member 10 having a latex coating 12 with a thickness 14 of less than 1 millimeter disposed on at least a portion of an outer side of the tubular member 10, which underlies cement layer 16 (FIG. 1B).

With reference to some embodiments, the coated well casing 24 is placed within borehole 20 (FIG. 2) or within tubular member 30 shown in FIG. 3, wherein like numerals are used to designate like parts. The cement slurry is placed in the annulus 22 around the coated casing 24, and allowed to set. The latex coating facilitates bonding. The annulus 22 is shown between the tubular member 24 and the borehole wall 20 (FIG. 2) or the tubular member 30 (FIG. 3). The logging tool 28 is then introduced to take measurements as described in some embodiments herein, for example, to map impedance and determine the presence of cement in the annulus 22 behind the well casing 24, or the absence thereof suggesting formation of a microannulus (not shown) between the well casing 24 and the set cement in the annulus 22.

The coated well casing 24 in FIGS. 2 and 3 (and/or tubular member 30 in FIG. 3) may be dimensionally changed in length, diameter, rotational alignment, etc., e.g., with respect to the wellbore 20 (FIG. 2) or the tubular member 30 (FIG. 3), some examples of which are indicated at 32. Expansion 26 of the cement set in the annulus 22 can occur before the dimensional change 32, and according to some embodiments of the disclosure, the bond between the cement and the well casing is maintained in the annulus 22 during and/or after the dimensional change 32, e.g., by further expansion or increased compression to accommodate the changing dimension(s).

With reference to FIG. 2, in some embodiments a zone 34 is isolated by placement, setting (initial and or final), and bonding of the cement to the well casing 24 in the annulus 22. The bonding can be maintained during dimensional change 32, e.g., so that the zone 34 remains in isolation and does not fluidly communicate via the annulus 22 with other zones in the formation.

As shown in FIG. 2, in embodiments, the bonds between the coated well casing 24 and the set cement, and between the borehole wall and the set cement are each sufficient to be acoustically coupled and/or to isolate a zone 34 of the formation adjacent the set cement, e.g., from another zone. In some embodiments, the bonding can be maintained during dimensional change 32, e.g., so that the zone 34 remains in isolation and does not fluidly communicate via the annulus 22 with other zones.

In embodiments, the well casing or other tubular is coated with the latex off-site and delivered to the well-site for installation into the wellbore. In other embodiments, the latex coating is applied at or near the well-site as part of a cementing job. In embodiments, the latex emulsion can be applied using an applicator to apply the latex emulsion to an outer surface of a tubular member to form a coated casing section for placement into a wellbore. In embodiments, the applicator may include apparatus suitable for spray coating, dipping, curtain coating, and the like. The only requirement for the applicator is the ability to dispense the latex emulsion as a uniform layer of appropriate thickness onto the outer surface of the well casing. In embodiments, the system may further include a cleaner, which in embodiments includes an apparatus suitable to clean the outside of the well casing prior to coating, e.g., washing equipment, acid etching equipment, sandblasting equipment, and the like. In embodiments, the system may include a dryer, which is an apparatus suitable to dry and cure the latex emulsion coating once applied to the outside of the metal tubular or other metal object.

In embodiments, the system further comprises a cement slurry and a pump to place the cement slurry in contact with the bond layer, e.g., downhole in the annulus between the coated tubular and a wall of the wellbore, wherein the cement slurry is placed and then allowed to harden to form a hardened cement member having a surface bonded to the metal member via the bond layer.

Embodiments Listing

Accordingly, the present disclosure provides the following embodiments, among others:

T1. A bonded cement structure, comprising a bond layer joining opposing surfaces of a metal member and a hardened cement member, the bond layer comprising a dried latex emulsion coating applied as a latex emulsion to the metal member surface and dried in place to a thickness greater than 0.01 millimeters and less than 1 millimeter, the hardened cement member comprising cement hardened from a cement slurry applied to the dried latex emulsion coating and set in place.

T2. The bonded cement structure according to embodiment E1, wherein the dried latex emulsion coating was dried by heating or irradiating the latex emulsion coating during the drying.

T3. The bonded cement structure according to embodiment E1 or E2, wherein the dried latex emulsion coating was tack free as determined according to ASTM D1640 at 23° C. and 50% relative humidity when the cement slurry was applied to the dried latex coating and set in place.

T4. The bonded cement structure according to any one of embodiments E1 to E3, wherein the bond layer increases an adhesion strength of the bond between the cement member and the metal member by at least 50% relative to the adhesion strength of the bond without the bond layer, wherein the adhesion strength is determined by a pull-off test at a displacement rate of 0.05 mm/minute.

T5. The bonded cement structure according to any one of embodiments E1 to E4, wherein an adhesion strength of the bond between the cement member and the metal member is greater than 0.15 MPa, wherein the adhesion strength is determined by a pull-off test at a displacement rate of 0.05 mm/minute.

T6. The bonded cement structure according to any one of embodiments E1 to E5, wherein the dried latex emulsion coating comprises natural latex, synthetic latex, or a combination thereof.

T7. The bonded cement structure according to any one of embodiments E1 to E6, wherein the dried latex emulsion coating has a thickness greater than 0.05 millimeters and less than 0.5 millimeters.

T8. The bonded cement structure according to any one of embodiments E1 to E7, wherein the metal member comprises iron, steel, steel alloy, or a combination thereof.

T9. The bonded cement structure according to any one of embodiments E1 to E8, wherein the dried latex emulsion coating comprises an emulsion polymerization product of a conjugated diene with a $C_{2-20}$ olefin.

T10. The bonded cement structure according to any one of embodiments E1 to E9, wherein the dried latex emulsion coating comprises an emulsion polymerization product of 1,3-butadiene, 2-methyl-1,3-butadiene, 2-chloro-1,3-butadiene, piperylene-2,3-dimethyl-1,3-butadiene styrene, methylstyrene, p-chlorostyrene, acrylic acid, methyl acrylate, methyl methacrylate, butyl acrylate, acrylonitrile, 2-phenoxy ethyl methacrylate, methyl 2-hydroxy ethyl acrylate, acrylonitrile, methyl vinyl ether, methyl vinyl ketone, neoprene, isoprene, or a combination thereof.

T11. The bonded cement structure according to any one of embodiments E1 to E10, wherein the dried latex emulsion coating comprises a styrene acrylic latex.

T12. The bonded cement structure according to any one of embodiments E1 to E11, wherein the metal member is a well tubular joint comprising a tubular metal member comprising a surface on which the bond layer is disposed.

T13. The bonded cement structure according to any one of embodiments E1 to E12, wherein the metal member is a tubular string disposed in a wellbore, the tubular string comprising a tubular metal member comprising an outer side on which the bond layer is disposed.

T14. The bonded cement structure according to embodiment E13, wherein the hardened cement member is an annular cement sheath having an inner surface bonded to the outer side of the tubular metal member via the bond layer.

T15. The bonded cement structure according to any one of embodiments E1 to E14, wherein the metal member is acoustically coupled to the hardened cement member.

M1. A method comprising:
coating a surface of a metal member with a latex emulsion;
drying the latex emulsion coating to form a bond layer on the surface having thickness greater than 0.01 millimeters and less than 1 millimeter;
placing a cement slurry in contact with the bond layer; and
hardening the slurry to form a cement member having an opposing surface bonded to the surface of the metal member via the bond layer.

M2. The method according to embodiment M1, wherein the surface of the metal member is a surface of a tubular metal member.

M3. The method according to embodiment M2 further comprising placing the tubular member in a string in a wellbore.

M4. The method according to embodiment M2 or M3, wherein the cement slurry is placed in the wellbore in contact with the bond layer; and the hardening of the slurry forms a cement member having an opposing surface bonded to the surface of the tubular metal member via the bond layer.

M5. The method according to embodiment M2 or M3, wherein the cement slurry is placed in an annulus around the tubular metal member in contact with the bond layer; and the hardening of the slurry forms an annular cement member having an opposing surface bonded to the outer surface of the tubular metal member via the bond layer.

M6. The method according to any one of embodiments M1 to M5, further comprising cleaning the surface of the metal member prior to the coating with the latex emulsion.

M7. The method according to any one of embodiments M1 to M6, further comprising heating or irradiating the latex emulsion coating during the drying of the latex emulsion coating.

M8. The method according to any one of embodiments M1 to M7, wherein the dried latex emulsion coating is tack free as determined according to ASTM D1640 at 23° C. and 50% relative humidity.

M9. The method according to any one of embodiments M1 to M8, wherein the bond layer increases an adhesion strength of the bond between the cement member and the metal member by at least 50% relative to the adhesion strength of the bond between the cement member and the metal member without the bond layer, wherein the strength is determined by a pull-off test at a displacement rate of 0.05 mm/minute.

M10. The method according to any one of embodiments M1 to M9, wherein an adhesion strength of the bond between the cement member and the metal member is greater than 0.15 MPa, wherein the adhesion strength is determined by a pull-off test at a displacement rate of 0.05 mm/minute.

M11. The method according to any one of embodiments M1 to M10, wherein the dried latex emulsion coating comprises natural latex, synthetic latex, or a combination thereof.

M12. The method according to any one of embodiments M1 to M11, wherein the dried latex emulsion coating has a thickness greater than 0.01 millimeters and less than 0.5 millimeters.

M13. The method according to any one of embodiments M1 to M12, wherein the metal member comprises iron, steel, steel alloy, or a combination thereof.

M14. The method according to any one of embodiments M1 to M13, wherein the dried latex emulsion coating comprises the emulsion polymerization product of a conjugated diene with a $C_{2-20}$ olefin.

M15. The method according to any one of embodiments M1 to M14, wherein the dried latex emulsion coating comprises the emulsion polymerization product of 1,3-butadiene, 2-methyl-1,3-butadiene, 2-chloro-1,3-butadiene, piperylene-2,3-dimethyl-1,3-butadiene styrene, methylstyrene, p-chlorostyrene, acrylic acid, methyl acrylate, methyl methacrylate, butyl acrylate, acrylonitrile, 2-phenoxy ethyl methacrylate, methyl 2-hydroxy ethyl acrylate, acrylonitrile, methyl vinyl ether, methyl vinyl ketone, neoprene, isoprene, or a combination thereof.

M16. The method according to any one of embodiments M1 to M15, wherein the dried latex emulsion coating comprises a styrene acrylic latex.

S1. A system comprising: a latex emulsion and an applicator for coating a surface of a metal member with the latex emulsion, which dries to form a dried latex emulsion coating having a thickness greater than 0.01 millimeters and less than 1 millimeter to form a bond layer on the surface of the metal member.

S2. The system according to embodiment S1, further comprising a dryer to at least partially dry the latex emulsion to form the dried latex emulsion coating.

S3. The system according to embodiment S1 or S2, further comprising a cleaner suitable to clean the surface of the metal member prior to coating the surface with the latex emulsion.

S4. The system according to any one of embodiments S1 to S3, further comprising a cement slurry and a pump to place the cement slurry in contact with the bond layer, wherein the cement slurry hardens to form a hardened cement member having a surface bonded to the metal member via the bond layer.

S5. The system according to any one of embodiments S1 to S4, wherein the latex emulsion coating comprises natural latex, synthetic latex, or a combination thereof.

S6. The system according to any one of embodiments S1 to S5, wherein the dried latex emulsion coating has a thickness greater than 0.05 millimeters and less than 0.5 millimeters.

S7. The system according to any one of embodiments S1 to S6, wherein the metal member comprises iron, steel, steel alloy, or a combination thereof.

S8. The system according to any one of embodiments S1 to S7, wherein the latex emulsion comprises an emulsion polymerization product of a conjugated diene with a $C_{2-20}$ olefin.

S9. The system according to any one of embodiments S1 to S8, wherein the latex emulsion comprises an emulsion polymerization product of 1,3-butadiene, 2-methyl-1,3-butadiene, 2-chloro-1,3-butadiene, piperylene-2,3-dimethyl-1,3-butadiene styrene, methylstyrene, p-chlorostyrene, acrylic acid, methyl acrylate, methyl methacrylate, butyl acrylate, acrylonitrile, 2-phenoxy ethyl methacrylate, methyl 2-hydroxy ethyl acrylate, acrylonitrile, methyl vinyl ether, methyl vinyl ketone, neoprene, isoprene, or a combination thereof.

S10. The system according to any one of embodiments S1 to S9, wherein the latex emulsion comprises a styrene acrylic latex.

S11. The system according to any one of embodiments S1 to S10, wherein the metal member is a well tubular joint.

S12. The system according to any one of embodiments S1 to S11, wherein the metal member is a tubular string for a wellbore.

T1. A well tubular joint for cementing in a wellbore, comprising a tubular metal member and a dried latex emulsion coating on a surface of the tubular member having a thickness greater than 0.01 millimeters and less than 1 millimeter.

T2. The well tubular joint according to embodiment T1, wherein the dried latex emulsion coating was applied as a latex emulsion to the metal member surface and dried in place by heating or irradiating the latex emulsion coating during the drying.

T3. The well tubular joint according to embodiment T1 or embodiment T2, wherein the dried latex emulsion coating is tack free as determined according to ASTM D1640 at 23° C. and 50% relative humidity.

T4. The well tubular joint according to any one of embodiments T1 to T3, wherein the dried latex emulsion coating comprises natural latex, synthetic latex, or a combination thereof.

T5. The well tubular joint according to any one of embodiments T1 to T4, wherein the dried latex emulsion coating has a thickness greater than 0.05 millimeters and less than 0.5 millimeters.

T6. The well tubular joint according to any one of embodiments T1 to T5, wherein the metal member comprises iron, steel, steel alloy, or a combination thereof.

T7. The well tubular joint according to any one of embodiments T1 to T6, wherein the dried latex emulsion coating comprises an emulsion polymerization product of a conjugated diene with a $C_{2-20}$ olefin.

T8. The well tubular joint according to any one of embodiments T1 to T7, wherein the dried latex emulsion coating comprises an emulsion polymerization product of 1,3-butadiene, 2-methyl-1,3-butadiene, 2-chloro-1,3-butadiene, piperylene-2,3-dimethyl-1,3-butadiene styrene, methylstyrene, p-chlorostyrene, acrylic acid, methyl acrylate, methyl methacrylate, butyl acrylate, acrylonitrile, 2-phenoxy ethyl methacrylate, methyl 2-hydroxy ethyl acrylate, acrylonitrile, methyl vinyl ether, methyl vinyl ketone, neoprene, isoprene, or a combination thereof.

T9. The well tubular joint according to any one of embodiments T1 to T8, wherein the dried latex emulsion coating comprises a styrene acrylic latex.

T10. The well tubular joint according to any one of embodiments T1 to T9, wherein the dried latex emulsion coating is on an outer side of the tubular member.

EXAMPLES

Figure 4:
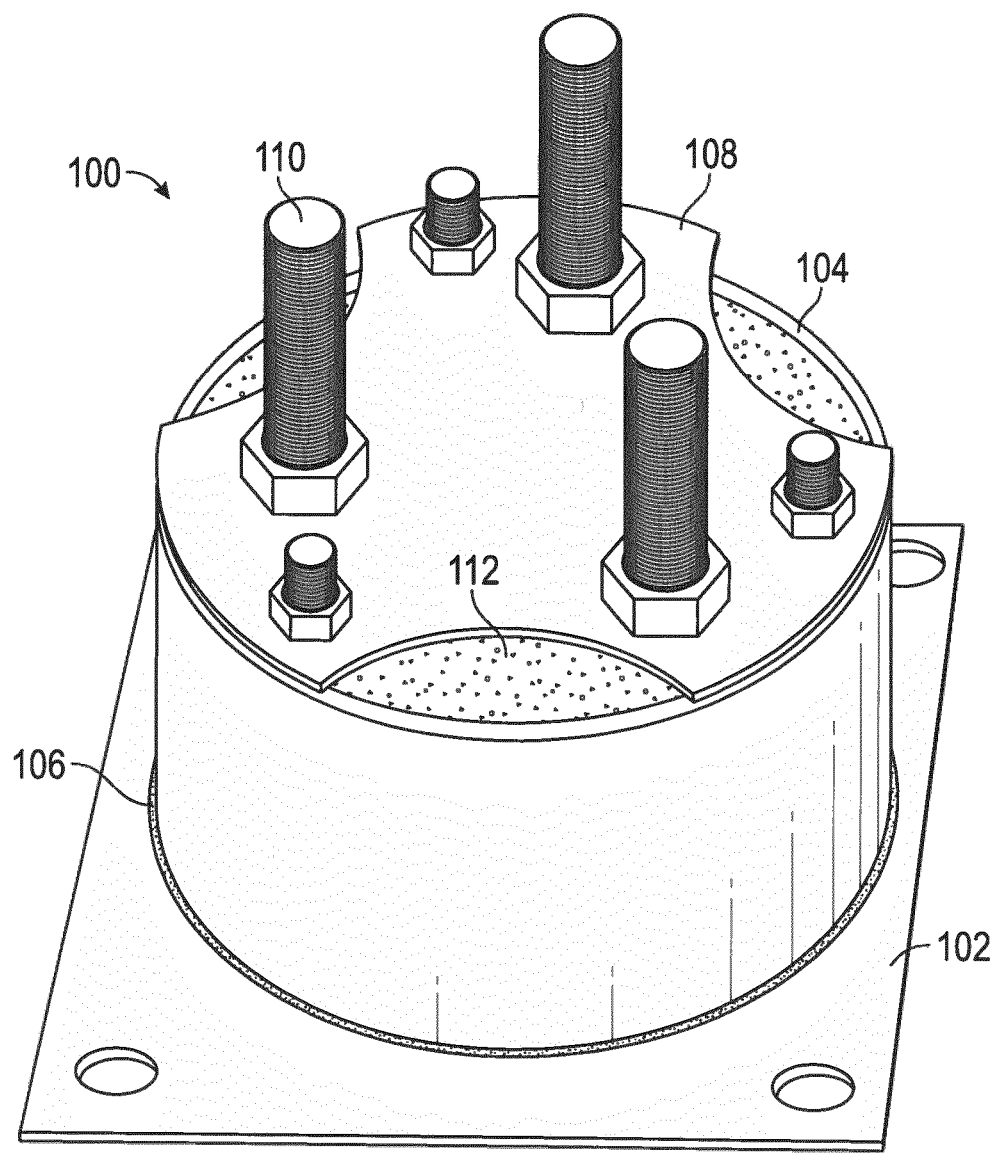
FIG. 4 shows a diagram of a testing rig to determine pull off force according to embodiments of the disclosure.

The testing apparatus shown in FIG. 4 was devised and various applications of a particular latex coating were tested to evaluate the adhesion strength, determined by a pull-off test at a displacement rate of 0.05 mm/minute. In the adhesion "pull-off" test the strength of the bond between a steel base plate and a set cement typically used in well cementing applications is evaluated. In each sample, a 3-inch square base plate (either stainless steel or carbon steel) was cleaned via sandblasting to a mat finish. A mold formed from a PVC cylinder 2 inches in diameter was temporality affixed to the base plate using a silicon adhesive. In the comparative examples, the base plate received no further treatment. In the examples according to the present disclosure, the section of the base plate within the mold was coated with a dried latex emulsion and treated as described per each sample. The mold was then filled with the cement slurry and an upper plate having three screws protruding there-through was placed on top of the mold such that a portion of each of the three screws was submerged within the cement slurry while another portion of each of the three screws protruded through the top plate. The samples were then left for seven days in a water bath at ambient temperature to allow the cement to fully set.

As indicated by the sample description, the cement slurry was used in neat form (i.e., without the addition of polymer particles) in some tests and modified by the addition of polymer particles to improve adhesion in other tests. The cement slurries also included dispersant and anti-settling agents as known in the art, and were mixed in agreement with ISO10426-2.

A total of seven sample groups were prepared using the same styrene acrylic latex composition:

Comparative Example A (SS-Uncoated)
A stainless steel base plate without a latex coating was used to perform the test. The mold was filled with the cement slurry and allowed to harden.

Comparative Example B (SS-100 μm-without Drying)
A stainless steel base plate was coated with a 100 μm coating of a styrene acrylic latex emulsion. Immediately after coating the base plate the mold was filled with cement slurry. In this example, the latex coating was not allowed to dry (the coating was not tack free).

Example C1

(SS-100 μm-Dried)
A stainless steel base plate was coated with a 100 μm coating of a styrene acrylic latex. The coating was allowed to dry for 15 h (overnight) at ambient conditions (i.e., 24° C. and ~50% relative humidity). The latex coating was tack free and dry through prior to the mold being filled with the cement slurry.

Example C2

(SS-100 μm-Dried—Polymer Cement)
A stainless steel base plate was coated with 100 μm coating of a styrene acrylic latex. The coating was allowed to dry for 15 h (overnight) at ambient conditions (i.e., 24° C. and ~50% relative humidity). The latex coating was tack free and dry through prior to the mold being filled with the cement slurry. In this example, the cement slurry further included polymer particles used in the art to improve adhesion of the cement to the well casing.

Example D (SS-1 mm-Dried)
A stainless steel base plate was coated with a 1 mm coating of a styrene acrylic latex. The coating was allowed to dry for 15 h (overnight) at ambient conditions (i.e., 24° C. and ~50% relative humidity). The latex coating was tack free prior to the mold being filled with the cement slurry.

Comparative Example A'

(CS-Uncoated)
A carbon steel base plate without a latex coating was used to perform the test. The mold was filled with the cement slurry and allowed to harden.

Example C'

(CS-100 μm-Dried)
A carbon steel base plate was coated with 100 μm coating of a styrene acrylic latex. The coating was allowed to dry for 15 h (overnight) at ambient conditions (i.e., 24° C. and ~50% relative humidity). The latex coating was tack free and dry through prior to the mold being filled with the cement slurry.

Adhesion Pull-Off Test:
To determine the quality of the bond between the well casing (as simulated by the steel base plate) and the latex coating, as well as the bond between the latex coating and the cement, pull-off tests were performed in which the base plate of the sample being evaluated was attached to the stationary end of a hydraulic press and the three screws secured by the set cement an protruding though the top plate were affixed to the movable end of the hydraulic press. The press was then engaged such that the top plate and screws were "pulled" vertically upward away from the base plate at a displacement speed of 0.05 mm/min while monitoring the force exerted by the press. The maximum force required to separate the cement sample from the base plate was recorded as the "pull-off" force. This maximum pull-off force, which was more than 100 times the weight of the mold, was then divided by the surface area of the portion of the cement sample in contact with the base plate. Each test was repeated at least once. The data reported in Table 1 are the average values with the associated error bars.

TABLE 1

Adhesion Testing Results

| Test Description (Base Plate - Latex) | Cement Slurry composition | Adhesion Strength, MPa | Adhesion Strength Ratio |
|---|---|---|---|
| Test A (SS-uncoated) | neat | 0.10 ± 0.01 | 1 |
| Test B (SS-100 μm-not dried) | neat | 0.08 ± 0.01 | 0.8 |
| Test C1 (SS-100 μm-dried) | neat | 0.24 ± 0.02 | 2.4 |
| Test C2 (SS-100 μm-dried) | cement/polymer composite | 0.21 ± 0.01 | 2.1 |
| Test D (SS-1 mm-dried) | neat | 0.06 ± 0.01 | 0.6 |
| Test A' (CS-uncoated) | neat | 0.05 ± 0.01 | 1 |
| Test C' (CS-100 μm-dried) | neat | 0.22 ± 0.03 | 4.4 |

As these data show, samples having a dried latex coating with a thickness of 100 μm (Tests C1, C2, C') greatly improved the adhesion of the cement relative to the uncoated base plate (Tests A, A'). In contrast, adhesion was worse when the coating was not allowed to dry (Test B), or when the coating was 1 mm in thickness (Test D).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein in the jurisdiction of the US, except for those in which the claim expressly uses the words 'means for' together with an associated function without specifying any structure.

We claim:

1. A method comprising:
   coating a surface of a metal member with a latex emulsion, the metal member as part of a tubular string disposed within a wellbore of a well;
   drying the latex emulsion coating to form a bond layer comprising a dried latex emulsion coating on the surface having thickness greater than 0.01 millimeters and less than 1 millimeter;
   placing a cement slurry in contact with the bond layer; and
   hardening the slurry to forma cement member having an opposing surface bonded to the surface of the metal member, wherein an adhesion strength of the bond between the cement member and the metal member is greater than 0.15 MPa, and wherein the adhesion strength is determined at a displacement rate of 0.05 mm/minute.

2. The method of claim 1, wherein the dried latex emulsion coating comprises natural latex, synthetic latex, or a combination thereof, and has a thickness greater than 0.01 millimeters and less than 0.5 millimeter, and wherein the metal member comprises iron, steel, steel alloy, or a combination thereof.

3. The method of claim 1, wherein the dried latex emulsion coating comprises the emulsion polymerization product of a conjugated diene with a C2-20 olefin.

4. The method of claim 1, wherein the dried latex emulsion coating comprises the emulsion polymerization product of 1,3-butadiene, 2-methyl-1,3-butadiene, 2-chloro-1,3-butadiene, piperylene-2,3-dimethyl-1,3-butadiene styrene, methylstyrene, p-chlorostyrene, acrylic acid, methyl acrylate, methyl methacrylate, butyl acrylate, acrylonitrile, 2-phenoxy ethyl methacrylate, methyl 2-hydroxy ethyl acrylate, acrylonitrile, methyl vinyl ether, methyl vinyl ketone, neoprene, isoprene, or a combination thereof.

5. A method comprising:
   coating a surface of a tubular metal member with a latex emulsion;
   drying the latex emulsion coating to form a bond layer on the surface having thickness greater than 0.01 millimeters and less than 1 millimeter;
   placing the tubular member in a string in a wellbore;
   placing a cement slurry adjacent the tubular metal member in contact with the bond layer; and
   hardening the slurry to form a cement member having an opposing surface bonded to the surface of the metal member, wherein an adhesion strength of the bond between the cement member and the metal member is greater than 0.15 MPa, and wherein the adhesion strength is determined at a displacement rate of 0.05 mm/minute.

6. The method according to claim 5, wherein the surface of the tubular member is an outer surface and the cement slurry is placed in an annulus around the tubular member.

7. The method according to claim 5, comprising heating or irradiating the latex emulsion coating during the drying.

8. The method of claim 5, wherein the dried latex emulsion coating comprises natural latex, synthetic latex, or a combination thereof, and has a thickness greater than 0.01 millimeters and less than 0.5 millimeter, and wherein the metal member comprises iron, steel, steel alloy, or a combination thereof.

9. The method of claim 5, wherein the dried latex emulsion coating comprises the emulsion polymerization product of a conjugated diene with a C2-20 olefin.

10. The method of claim 5, wherein the dried latex emulsion coating comprises the emulsion polymerization product of 1,3-butadiene, 2-methyl-1,3-butadiene, 2-chloro-1,3-butadiene, piperylene-2,3-dimethyl-1,3-butadiene styrene, methylstyrene, p-chlorostyrene, acrylic acid, methyl acrylate, methyl methacrylate, butyl acrylate, acrylonitrile, 2-phenoxy ethyl methacrylate, methyl 2-hydroxy ethyl acrylate, acrylonitrile, methyl vinyl ether, methyl vinyl ketone, neoprene, isoprene, or a combination thereof.

11. A method comprising:
coating a surface of a metal member with a latex emulsion, the metal member as part of a tubular string disposed within a wellbore of a well;
drying the latex emulsion coating to form a bond layer comprising a dried latex emulsion coating on the surface having thickness greater than 0.01 millimeters and less than 1 millimeter, wherein the dried latex emulsion coating comprises a styrene acrylic latex;
placing a cement slurry in contact with the bond layer; and
hardening the slurry to form a cement member having an opposing surface bonded to the surface of the metal member.

12. A method comprising:
coating a surface of a tubular metal member with a latex emulsion;
drying the latex emulsion coating to form a bond layer comprising a dried latex emulsion coating on the surface having thickness greater than 0.01 millimeters and less than 1 millimeter,
wherein the dried latex emulsion coating comprises a styrene acrylic latex; and
placing the tubular metal member in a string in a wellbore.

* * * * *